April 18, 1961 H. KOERNER 2,980,412
ROTARY FURNACE

Filed Sept. 26, 1957 3 Sheets-Sheet 1

FIG. I

INVENTOR.
HANS KOERNER
BY
ATTORNEY.

INVENTOR.
HANS KOERNER

ATTORNEY.

April 18, 1961

H. KOERNER 2,980,412

ROTARY FURNACE

Filed Sept. 26, 1957

INVENTOR.
HANS KOERNER

BY

ATTORNEY.

2,980,412
ROTARY FURNACE

Hans Koerner, Broeleck, Siegkreis, Germany, assignor to Selas Corporation of America, Dresher, Pa., a corporation of Pennsylvania
Filed Sept. 26, 1957, Ser. No. 686,341
10 Claims. (Cl. 263—12)

The present invention relates to furnaces, and more particularly to a circular furnace that is used for melting and refining metals.

In the melting of metals it has been customary to use a furnace in which the metal was placed during the melting period, and to which solid metal is added from time to time in order to maintain the supply. This type of apparatus is essentially a batch process that does not lend itself easily to maintaining constant metal temperature or to the production of various alloys. Furthermore, if the batch should become contaminated the entire furnace must be shut down for an indefinite period while it is being cleaned.

It is an object of the present invention to provide a furnace in which a plurality of batches of metal can be melted one after the other in a single furnace structure. It is a further object of the invention to provide apparatus in which individual batches of metal can be melted, refined and alloyed on a continual basis.

An additional object of the invention is to provide a circular furnace in which a plurality of batches of metal can be treated individually while they are being moved through a path in the furnace, and presented to a casting zone in the same condition.

It is a further object of the invention to provide a furnace in which a salt or other heat treating medium can be heated in sequence to different temperatures to carry the material being treated through a desired cycle.

In carrying out the invention there is provided a plurality of furnace cars each of which comprises a hearth in which a batch of metal is contained. These cars are segmental in shape so that a plurality of them, shown herein as six, form a complete circle. Cooperating with the cars, and above them, is a circular furnace roof that is divided into the same number of sections as there are cars. Each section is designed to perform a particular function in the melting and refining of the metal so that material in the various cars can be treated simultaneously. In operation, the cars are progressively moved under the various roof sections to perform the entire melting and refining operation in what is, in effect, a plurality of connected furnaces performing separate steps of a single process. When the metal in one car has been used that in the next car is ready for use so that, from the point of view of use, the process is essentially continuous.

The invention will be described as it is used for the melting of aluminum, although it is obvious that it may be used in connection with any metal, and particularly non-ferrous metals.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
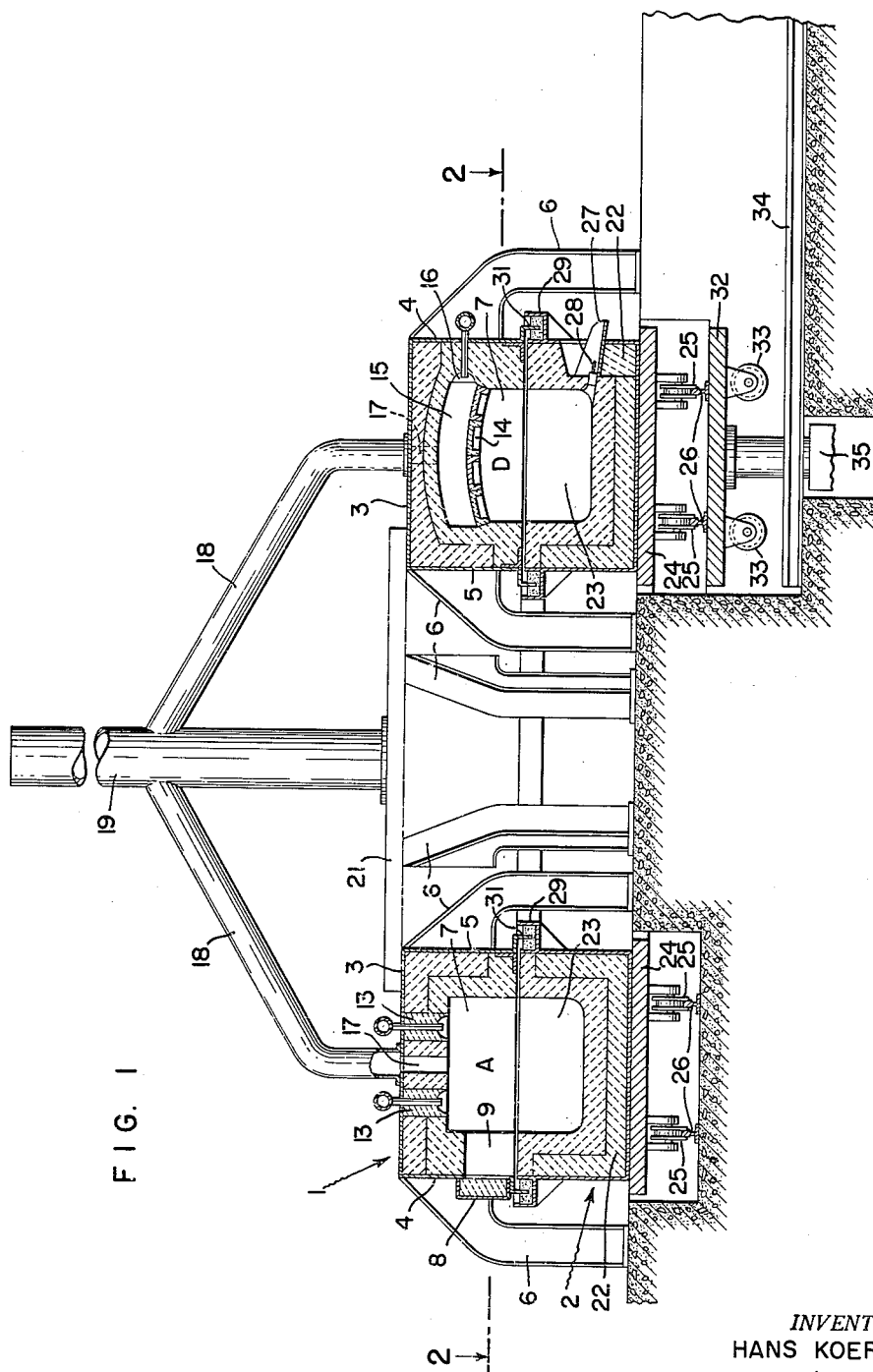
Fig. 1 is a section through the furnace taken on line 1—1 of Fig. 2.

Referring to the drawings, there is shown a furnace which comprises a roof structure 1 and a separate hearth structure 2. The roof structure is ring-shaped and is constructed of refractory with metal backing in accordance with ordinary furnace practice. This portion of the furnace includes a top 3 and a depending outer side 4 and an inner side 5 which together form an inverted annular channel. This structure is supported a predetermined distance above the floor by means of a plurality of supports 6.

The roof structure is divided into a plurality of individual sections or combustion chambers that are lettered A to F inclusive, by means of a series of partitions 7. Each of the sections is provided with suitable access openings that can be closed by doors in front of them. As shown, sections A and B are provided with relatively large openings 9 that are closed by doors 8 which can be raised and lowered by any suitable mechanism, which is not shown.

Each of the sections is heated individually by suitable burners. As shown here sections A, B and C are heated by radiant cup type burners of the kind disclosed in Hess Patent 2,215,079, which burners are located in the roof 3. These burners fire downwardly and are designed to produce a majority of their heat by radiation which is directed against the portion of the hearth that is located under each of these sections. Sections D, E and F can be and preferably are provided with a horizontally extending muffle wall 14 that separates the lower portion of the section from an upper firing chamber 15. Suitable burners 16 are provided to fire into chamber 15 to heat the muffle wall 14 and thereby heat the portion of the hearth under these walls without that portion of the hearth being subjected to contaminating combustion gases. The various sections of the hearth are provided with individual exhaust openings 17 through which the products of combustion from each section can be withdrawn through individual ducts 18 that connect with a central stack 19. This stack is of such a height and may if necessary be provided with a blower so that a relatively small negative pressure is maintained in the various sections of the furnace. The duct 19 is supported at its lower end on a suitable framework 21 that is attached to the inner structure supports 6.

The hearth section 2 of the furnace consists of a plurality of cars that, when placed end to end, form a circle of the same diameter as the roof section. The cars are shown herein as being six in number, which is the same number of sections formed in the roof structure by the partitions 7. Each car forms a melting pot and is of a size so that when the cars are located between the partions there are in effect, six individual furnaces formed in the furnace structure. Each car is constructed in accordance with ordinary furnace practice of suitable insulating refractory and refractory that will withstand the effects of the metal or other material being melted. As shown, the cars are segmental in shape. Each car is provided with a frame 24 that has a plurality of wheels 25 journaled for rotation on the lower side thereof. These wheels ride on a pair of circular tracks 26 so that the cars can be moved in unison to move them from one furnace section to the other. Each car is shown as being provided with a bottom that slopes toward a pouring opening having a pouring spout 27 extending outwardly therefrom. The opening is closed by a removable plug 28. In order to prevent contamination of the metal in each of the furnace sections from atmosphere that might flow into the furnace between the bottom of side walls 4 and 5 and the top of the cars, there is provided a sealing means between these two parts. This means consists of a continuous trough 29 that is formed in sections on both the inside and the outside of each of the cars which troughs can hold a sealing medium such as sand. Flanges 31 extend downwardly from the sides 4 and 5 into the troughs in order to seal the apparatus.

From time to time it will be necessary to remove one or more of the cars for repair or for relining. In order to permit this to be accomplished, one portion of the track, which is shown as being the portion under section D of the furnace, is separated from the rest. The tracks 26 of this portion are mounted on a platform 32 that is provided with wheels 33 extending in a radial direction. When it is desired to remove one of the cars an elevating mechanism 35 can be used to lower platform 32 until wheels 33 engage a pair of radially extending tracks 34. The car and its platform can then be moved radially outward to the position shown in dotted lines in Fig. 2. It is only necessary for the elevating mechanism to raise and lower the car sufficiently to remove flange 31 from the troughs 29. During the time that a car is being repaired another car can be moved into place so that the hearth portion of the furnace is complete at all times.

Figure 2:
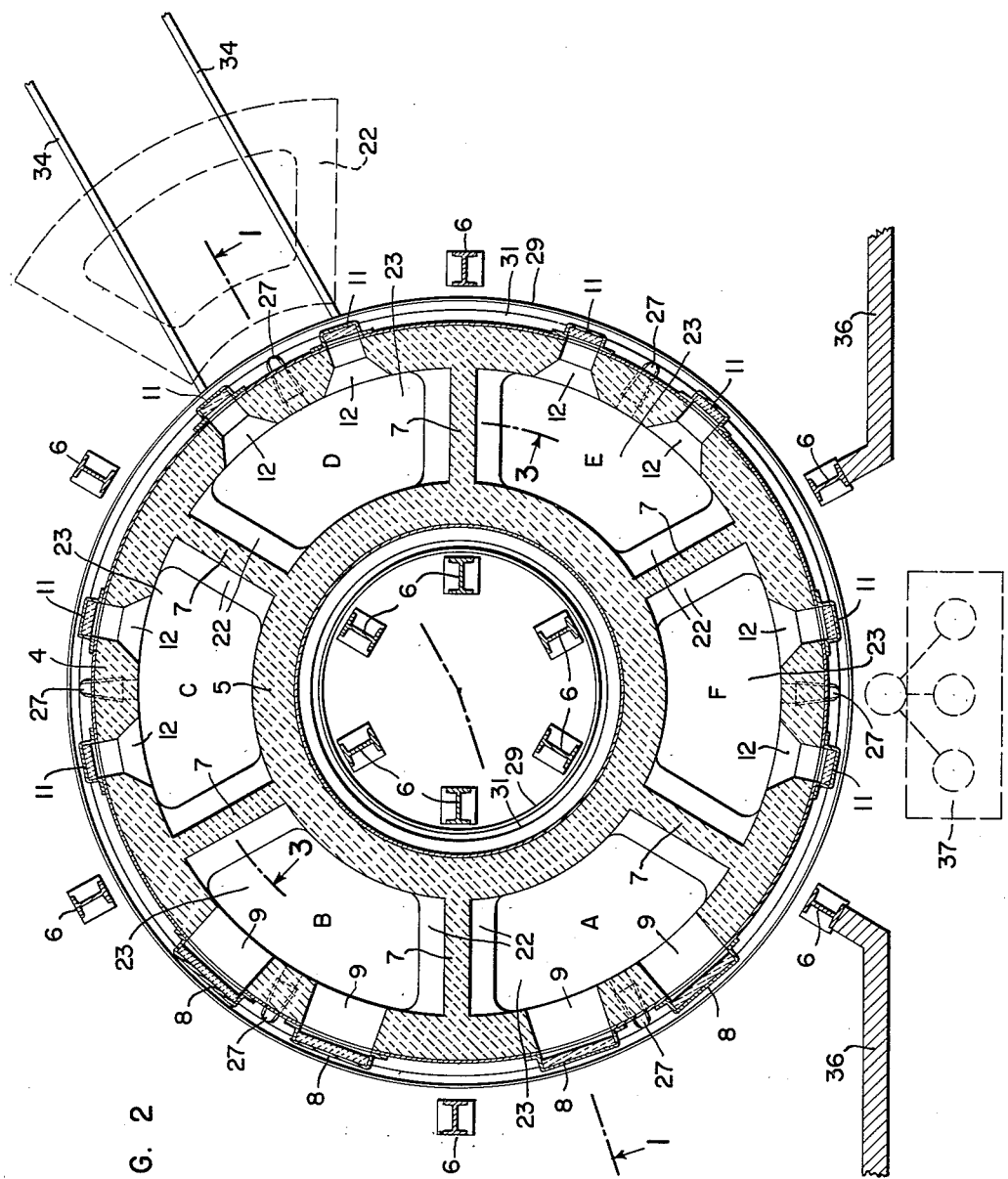
Fig. 2 is a section of the furnace taken on line 2—2 of Fig. 1.

The arrangement of the furnace is such that the melting and alloying room can be separated from the casting room of a foundry. In order to accomplish this, walls 36 can be built which separate section F from the other sections, as shown in Fig. 2, so that the car which is located in section F will be in a position to discharge its metal from spout 27 into a casting apparatus shown diagrammatically at 37.

Figure 4:
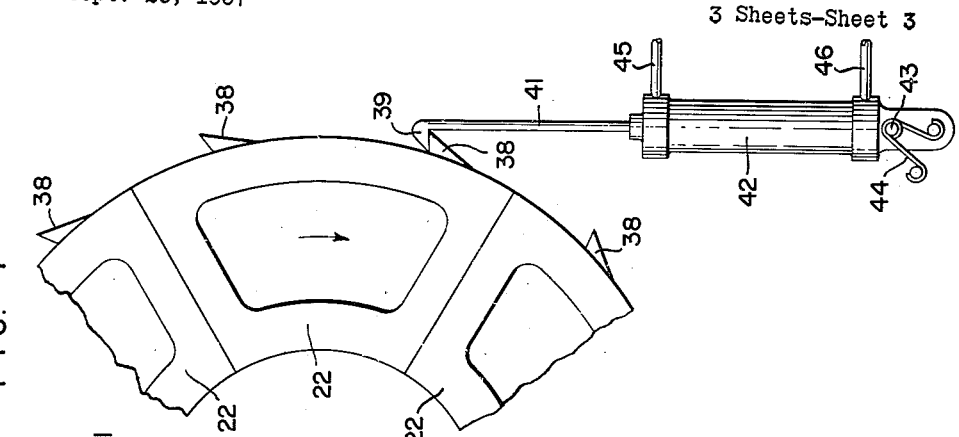
Fig. 4 is a diagrammatic showing of one means to rotate the furnace hearth.
Figure 3:
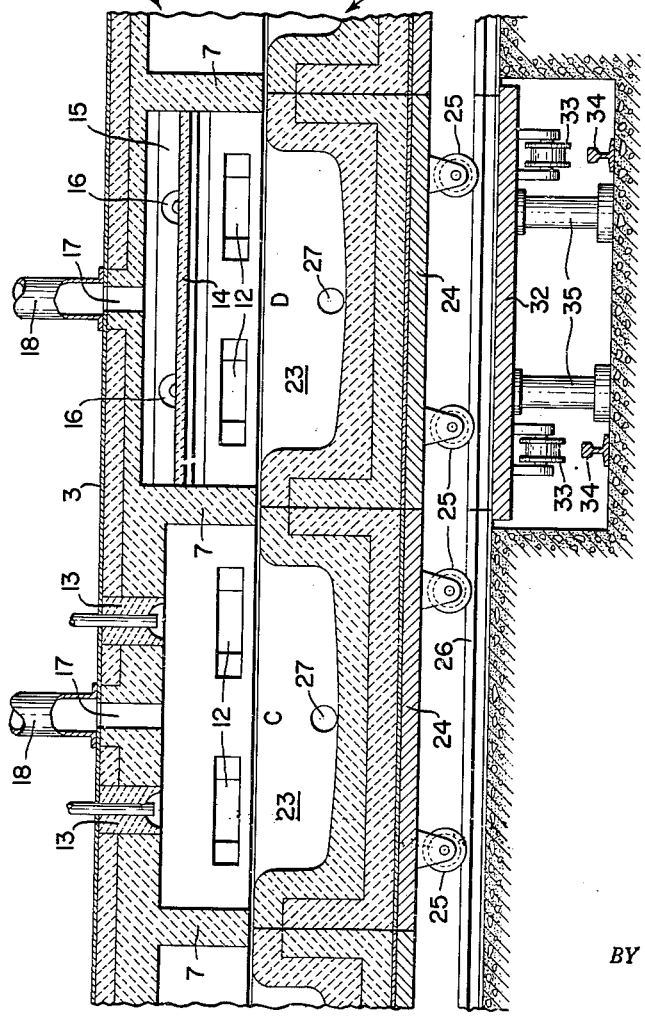
Fig. 3 is a section through a portion of the furnace taken on line 3—3 of Fig. 2.

At periodic intervals during the operation of the furnace it is necessary to move the cars forming the hearth from under one section to a position under the next section of the roof. Since the cars abut each other to form a continuous structure any suitable apparatus can be used for this purpose. Because of the operation of the furnace, which will be described below, it is preferred to index the hearth intermittently for a distance equal to the arc covered by one of the sections. An indexing means is shown diagrammatically in Fig. 4. As shown therein, each car is provided with a pair of outwardly extending lugs 38 that are engaged by a hook 39 formed on the end of a piston rod 41. A piston on the end of this rod is received in a cylinder 42 that is pivoted at 43 and is biased in a counter clockwise direction by a spring 44. In the operation of this mechanism, fluid is introduced through a pipe 45 into the left end of the piston, thereby causing the piston rod to be withdrawn into the piston. Hook 39 that is engaged behind one of lugs 38 will move the hearth in a clockwise direction shown in Fig. 4. The hook is returned to engage the next lug by introducing fluid into the other end of cylinder 42 through pipe 46. It will require two operations of the piston to index the hearth sufficiently to move a car from one section of the roof to the next.

In the operation of the furnace, doors 8 of section A are opened, and metal to be melted is charged into the car 22 that is then located at that section. The burners 13 in the roof of section A are being fired so that melting begins as the car is being loaded. After the car in section A is loaded the indexing mechanism is operated to bring another car into section A to be loaded. Melting of the load that was in section A continues and is completed in section B by radiant burners that are located in the roof of that section. Since the furnace pressure in this section is maintained slightly below atmospheric, most of the combustion gases from the burners are withdrawn prior to the time that they can contact the metal. The charge is therefore melted down predominantly by radiation practically free of gases. Section B of the furnace is provided with large openings through which additional metal may be added if desired. In this section the melt can be treated with cleaning and degasing compounds.

In section C refining of the metal can begin and alloying elements can be added to the melt if desired. In any event, the metal charge is liquid by this time. Slag can be removed through the openings 12 of this and the remaining sections if necessary.

The next two sections of the furnace, D and E, are used for holding and curing of the melt. Since the metal is already liquid, it is only necessary to supply enough heat to compensate for the radiation losses from the hearth and to keep the metal at the desired temperature. This can be supplied economically from the muffle roof 14. An added advantage of this construction is that the furnace chamber above the hearth is free from any products of combustion and any possible contaminating effects. If desired, a neutral or protective atmosphere can be introduced into these sections further to protect the metal.

It is possible to put a bumpy surface on the track 26 adjacent to sections C, D and E so that the cars will be shaken as they are moved into position in these sections. Such action will vibrate the metal and help rising of occluded gases and refining of the melt. Such bumps or vibrations will not have a detrimental effect on the roof structure since the cars are not mechanically connected to it.

Section F is the casting station. By the time a car reaches this location the metal contained therein is completely refined and alloyed, and is at the correct temperature for casting, which is accomplished by removing plug 28. If desired, some means similar to platform 32 can be used to tilt the cars in order to facilitate the casting operation. The use of walls 36 effectively separate the casting room from the charging room. Such an arrangement helps to insure that the casting room will be kept free from dust and fumes.

The furnace is shown as being provided with six sections. It will be appreciated, however, that a different number of sections and cars could be used if desired. Such number would depend on the type of metal being melted, and the volume that is required for casting. It will also be apparent that a larger or smaller number of furnace sections can be provided with a muffle 14 if it is so desired. If sufficient heat is supplied in sections A and B for melting the metal, section C could, for example, be supplied with a muffle roof instead of the radiant burners 13 as shown.

The operation of the furnace is such that there is always a car of metal waiting to be cast, and as soon as the casting is completed the empty car is moved into a position to be reloaded and the cycle started again. If desired, different cars can be used for different metals or alloys. Thus, it is possible to change from one metal to another in the casting process with the use of a single furnace and without the necessity of stopping the operation while a furnace is cleaned out and remelting takes place.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a furnace, a plurality of cars that, placed end to end, form a circle, each car having a hearth thereon including side and end walls upon which metal is adapted to be melted, a circular structure forming a roof and side walls with the side walls being over said side walls of said cars, means dividing said structure into a plurality of sections each the size of one of said cars and cooperating with the end walls of said cars whereby each car and section forms an individual combustion chamber, a plurality of burners in said roof firing into one of said chambers, means in said structure to heat another of said chambers, a circular track upon which said cars move, means to move said cars on said track to bring different cars into operative relation with different sections of said structure, means to lower a car and the portion of track upon which it rests, when in position under a given section, out of cooperative relation with said roof, and means to move said car and track portion radially outward from said structure.

2. In a furnace, the combination of structure forming a circular roof and depending side walls, a plurality of radial partitions dividing said structure into sections, a circular track, means to support said structure concentrically above said track, a plurality of cars forming a circle on said track, each of said cars having a hearth thereon provided with side and end walls with said car side walls spaced to be aligned with said depending side walls and said car end walls being spaced to be aligned with said partitions of said structure, seals between said depending side walls and the side walls of said cars, whereby each car and the section above the same forms an individual chamber, burners in said roof firing into one of said chambers, separate burner means in said structure to heat another of said chambers, and means to move said cars along said track to bring the hearths thereon between different partitions and thereby use different cars to form different chambers in sequence as said cars are moved.

3. In a furnace, structure forming a ring-shaped roof, side walls depending from the inner and outer edges of said roof, radial partitions extending between said side walls to divide said roof into a plurality of sections, means to heat each of said sections individually, a plurality of segment shaped cars having side walls spaced apart the same distance as said depending side walls and forming a ring the same size as said roof, each car being of a length equal to one of said sections, means forming a metal melting pot between the sides of each car, means to mount said structure above said cars with the said structure and cars aligned, means to mount said cars for movement under and concentric with said roof and to move said cars to positions where the cars and sections form separate melting compartments, means in one of said side walls of said structure through which metal to be melted can be supplied to said cars, and means in a side wall of each car through which melted metal can be withdrawn from each car.

4. The combination of claim 3 including means located under one section of the roof to move the car at that section radially outward from beneath said roof.

5. In a furnace, the combination of a plurality of cars so shaped that, placed end to end, they form a circle, a circular track, means to mount said cars on said track for movement therealong, each car being provided with side and end walls forming a metal melting pot, structure forming a ring-shaped, inverted channel over said cars, means to support said structure over said cars and slightly separated therefrom with sides of said channel in substantially axial alignment, burners in said structure to heat said cars, a portion of said track sufficient to support a car being separate from the rest of the track, a second track below said portion and extending radially outward therefrom, a platform having wheels thereon to support said portion, said wheels being adapted to run on said second track, and means to lower said platform to place said wheels on said second track whereby the car carried by said portion of the track can be moved radially outward from below said structure.

6. The combination of claim 5 including means to seal the space between said cars and structure and in which said means to lower will move a distance sufficient to break said seal.

7. In a furnace, a ring-shaped inverted channel of refractory material forming a roof and side walls, a plurality of partitions dividing said channel into a plurality of sections, radiant burners in the roof of some of said sections, a muffle wall forming a combustion chamber between the roof and wall in the remainder of said sections, burner means firing in said chambers to heat said muffle wall, means to support said channel in an elevated position, a circular track beneath and concentric with said channel, a plurality of cars placed end to end on said track, said cars being so shaped that they form a circle the same size as said channel, means forming a melting pot on each car, the sides of said pots cooperating with the walls of said channel and said partitions to form a plurality of individual melting chambers, means to move said cars on said track to bring various cars under various sections of said channel, means in the wall of one section through which metal may be charged into said pots, and means in each pot through which molten metal can be withdrawn.

8. In a furnace, the combination of an elevated, channel shaped, circular structure forming the roof and a portion of the side walls of a circular furnace, a circular track under said structure, a second circular structure forming the floor and the remainder of the side walls of the furnace mounted for rotation on said track and axially under said first structure, sealing means between the side wall portions of each structure, radially extending means to divide each of said structures into a plurality of sections each having side and end walls, sections of the first structure having the same area as and cooperating with sections of said second structure with the walls of said second structure directly under the walls of said first structure to form a plurality of compartments, the sections cooperating to form each compartment changing as said second structure is rotated on said tracks, separate means located in each section of said first structure to heat individually the compartment of which the sections form a part, and means in each section of said second structure to receive metal to be heated.

9. The combination of claim 8 in which the means forming each section of said second structure is an individual car, and means for moving said cars in unison along said tracks.

10. In a furnace, a plurality of cars that, placed end to end, form a circle, each car having thereon a hearth including side and end walls, upon which metal is adapted to be melted, a circular structure forming a roof and downwardly extending side walls with its side walls being over and aligned with said side walls of said cars, radially extending partitions between the side walls of said structure dividing said structure into a plurality of sections each the size of one of said cars and located vertically above and aligned with the end walls of said cars whereby each car and section forms an individual combustion chamber, burner means in some of said sections to heat separately the chambers in which they are located, a circular track upon which said cars move, and means to move said cars on said track to bring different cars into operative relation with different sections of said structure.

References Cited in the file of this patent

UNITED STATES PATENTS

| | | |
|---|---|---|
| 248,801 | Sebillot | Oct. 25, 1881 |
| 490,451 | Nau | Jan. 24, 1893 |
| 631,414 | Anker | Aug. 22, 1899 |
| 1,362,296 | Hagan et al. | Dec. 14, 1920 |
| 2,499,926 | Lloyd | Mar. 7, 1950 |
| 2,507,274 | Sevenich | May 9, 1950 |
| 2,680,011 | Holcroft | June 1, 1954 |
| 2,899,189 | Matis et al. | Aug. 11, 1959 |

FOREIGN PATENTS

| | | |
|---|---|---|
| 266,368 | Great Britain | Dec. 8, 1927 |